(12) United States Patent
Edwards et al.

(10) Patent No.: US 11,765,162 B2
(45) Date of Patent: *Sep. 19, 2023

(54) SYSTEMS AND METHODS FOR AUTOMATICALLY PERFORMING SECONDARY AUTHENTICATION OF PRIMARY AUTHENTICATION CREDENTIALS

(71) Applicant: Capital One Services, LLC, McLean, VA (US)

(72) Inventors: Joshua Edwards, Philadelphia, PA (US); Jason Ji, Reston, VA (US); Ljubica Chatman, New York, NY (US); Michael Mossoba, Arlington, VA (US); Carlos Rodriguez, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,259

(22) Filed: Feb. 24, 2022

(65) Prior Publication Data

US 2022/0182380 A1 Jun. 9, 2022

Related U.S. Application Data

(63) Continuation of application No. 16/871,326, filed on May 11, 2020, now Pat. No. 11,290,450, which is a
(Continued)

(51) Int. Cl.
*H04L 9/40* (2022.01)
*H04W 12/08* (2021.01)
*H04W 12/06* (2021.01)

(52) U.S. Cl.
CPC ........ *H04L 63/0861* (2013.01); *H04L 63/083* (2013.01); *H04L 63/102* (2013.01);
(Continued)

(58) Field of Classification Search
CPC . H04L 63/0861; H04L 63/083; H04L 63/102; H04L 2463/082; H04W 12/08
See application file for complete search history.

(56) References Cited

U.S. PATENT DOCUMENTS 8,208,900 B2   6/2012   Adler et al.
8,528,049 B1 *  9/2013   Khen ............... H04L 63/08
                                              382/187

(Continued)

OTHER PUBLICATIONS

Behavioral Biometrics, International Biometrics+Identity Association, pp. 1-8, Washington, DC, IBIA.org.
(Continued)

*Primary Examiner* — Phy Anh T Vu
(74) *Attorney, Agent, or Firm* — TROUTMAN PEPPER HAMILTON SANDERS LLP; Christopher J. Forstner; John A. Morrissett

(57) ABSTRACT

The disclosed technology includes systems and methods for determining secondary authentication of a user's log-in attempts by comparing received behavioral biometric data and/or received scenario-specific data to saved behavioral biometric data and/or saved scenario-specific data, respectively. Responsive to determining that the received behavioral biometric data and/or received scenario-specific data is above a predetermined threshold of similarity with respect to the saved behavioral biometric data and/or saved scenario-specific data, respectively, the systems and methods can determine that the corresponding log-in attempt is secondarily authenticated. of a user device via behavioral biometric data. Responsive to determining that the level of similarity is not above the predetermined threshold, the systems and
(Continued)

methods can initiate a secondary authentication method and can associate the received behavioral biometric data with a second user model.

17 Claims, 5 Drawing Sheets

Related U.S. Application Data continuation of application No. 16/436,437, filed on Jun. 10, 2019, now Pat. No. 10,652,238.

(52) U.S. Cl.
CPC ......... *H04W 12/068* (2021.01); *H04W 12/08* (2013.01); *H04L 2463/082* (2013.01)

(56) References Cited

U.S. PATENT DOCUMENTS

| | | | |
|---|---|---|---|
| 8,752,144 B1 | 6/2014 | Kaufman et al. | |
| 9,053,310 B2 | 6/2015 | Oberheide et al. | |
| 9,185,095 B1 | 11/2015 | Moritz et al. | |
| 9,400,800 B2 | 7/2016 | Jacobson et al. | |
| 9,407,754 B1 | 8/2016 | Benoit et al. | |
| 9,426,139 B1 | 8/2016 | McClinktock et al. | |
| 9,443,073 B2 | 9/2016 | Oberheide et al. | |
| 9,509,688 B1* | 11/2016 | Magi Shaashua | H04L 63/0861 |
| 9,529,987 B2* | 12/2016 | Deutschmann | G06F 21/31 |
| 10,425,420 B2 | 9/2019 | Kovega | |
| 10,652,238 B1* | 5/2020 | Edwards | H04W 12/10 |
| 11,290,450 B2* | 3/2022 | Edwards | H04L 63/102 |
| 2010/0218240 A1* | 8/2010 | Chiruvolu | G06F 21/36 |
| | | | 726/5 |
| 2012/0232430 A1 | 9/2012 | Boissy et al. | |
| 2014/0041020 A1 | 2/2014 | Zhao et al. | |
| 2014/0157390 A1 | 6/2014 | Lurey et al. | |
| 2014/0282975 A1 | 9/2014 | Linszner | |
| 2015/0113633 A1 | 4/2015 | Yeom | |
| 2015/0178374 A1* | 6/2015 | Rahat | G06F 21/316 |
| | | | 707/740 |
| 2015/0324563 A1 | 11/2015 | Deutschmann et al. | |
| 2016/0021090 A1 | 1/2016 | Qian | |
| 2016/0197918 A1* | 7/2016 | Turgeman | G06F 21/316 |
| | | | 726/4 |
| 2017/0132087 A1 | 5/2017 | Dowlatkhah et al. | |
| 2017/0364673 A1* | 12/2017 | Gupta | G06F 21/36 |
| 2018/0077166 A1 | 3/2018 | Kovega | |
| 2018/0242149 A1 | 8/2018 | Verma et al. | |
| 2019/0065731 A1* | 2/2019 | Brocious | H04L 9/0838 |
| 2019/0251380 A1 | 8/2019 | Park et al. | |
| 2019/0325125 A1 | 10/2019 | Pantfoerder et al. | |
| 2019/0327228 A1 | 10/2019 | Pantfoerder et al. | |

OTHER PUBLICATIONS

Moskovitch, R., et al., "Identity Theft, Computers and Behavioral Biometrics", 2009, pp. 155-160, Intelligence and Security Informatics.

Teh, P.S., et al., "A Survey of Keystroke Dynamics Biometrics", 2013, pp. 1-24, The Scientific World Journal, Hindawi Publishing Corporation.

Qin, T. et al., "Multilevel User Cluster Mining Based on Behavior Profiles for Network Monitoring," Sep. 5, 2014, IEEE, INSPEC #15602734 (Year: 2014).

Monroy, J. et al., "Automatic Profiling and Behavior Prediction of Computer System Users," Oct. 18-19, 2006, IEEE, INSPEC #9462785 (Year: 2006).

* cited by examiner

SYSTEMS AND METHODS FOR AUTOMATICALLY PERFORMING SECONDARY AUTHENTICATION OF PRIMARY AUTHENTICATION CREDENTIALS

CROSS REFERENCE TO RELATED APPLICATIONS

This application is a continuation of, and claims priority under 35 U.S.C. § 120 to, U.S. patent application Ser. No. 16/871,326, filed May 11, 2020, which is a continuation of U.S. patent application Ser. No. 16/436,437, now U.S. Pat. No. 10,652,238, filed Jun. 10, 2019, the entire contents of which are fully incorporated herein by reference.

FIELD OF INVENTION

The present disclosure relates to systems and methods for passively verifying a user's identity, and more particularly to systems and methods for behavioral profiling.

BACKGROUND

Users are often required to log into various networks, accounts, services, portals, websites, applications, and other environments. Fraudulent users may be capable of obtaining a user's log-in information (e.g., username and password) for a given environment and entering the log-in information quickly and with a high degree of accuracy, such as by employing a bot or script to automatically enter log-in information for one or more users. For example, a fraudulent user may enter log-in information quickly and error-free, such as by copying and pasting the log-in information, whereas a legitimate user may manually enter the log-in information, which can be comparatively time consuming and carry a comparatively high likelihood of error during entry. To counter such fraudulent activity, there exist methods of tracking so-called behavioral biometrics of a user. As opposed to simply determining what data is entered (e.g., determining whether a proffered password is correct), behavioral biometrics refers to determining how the data is entered, such as by monitoring keystroke dynamics.

Existing systems may analyze data being inputted by a user into a computing device as the user attempts to access an environment. The inputted data is often compared to a stored user profile to determine whether the inputted data is indicative of the user in question inputting the data. Existing systems may determine a similarity score of the inputted data to the stored user profile, and if the similarity score is above a predetermined threshold, the user's behavioral biometrics may be considered authenticated, such that if the user entered the correct log-in information, the user is granted access to the environment. If the score is below the predetermined threshold, the user's session in the environment may be flagged for additional security methods, such as some other form of secondary user authentication. Alternately, the user may be refused access to the environment unless the correct behavioral biometric data is provided or some other secondary user authentication is completed.

Existing systems, however, may not accurately accommodate scenarios in which a user switches between manually entering log-in information and using a password manager or some other form of automated log-in information entry. In addition, behavioral biometric data for a user may vary based on the type of computing device used by the user, and existing systems may not accurately accommodate scenarios in which a user switches between different computing devices and/or different types of computing devices. Moreover, behavioral biometric data for a user using a given computing device may vary based on the physical position of a user. For example, behavioral biometric data associated with a user entering log-in information on a mobile phone while the user is in a prone position may be substantially different from behavioral biometric data associated with the same user entering the same log-in information on the same mobile phone while the user is in a standing position, and behavioral biometric data associated with the same user entering the same log-in information on the same mobile phone while the user is in a seated position may be different still. As another example, behavioral biometric data associated with a user entering log-in information on a laptop computer while the user is in a seated position may be different from behavioral biometric data associated with the same user entering the same log-in information on the same laptop computer while the user is lying down.

SUMMARY

These and other issues may be addressed by the technology disclosed herein, which includes systems and methods for monitoring and analyzing behavioral biometric data for a user across various computing devices, operating systems, and other environments. The disclosed technology can include systems and methods for monitoring and analyzing behavioral biometric data for a user using multiple entry methods for log-in information, such as manual entry and entry via a password manager. The disclosed technology can include systems and methods for monitoring and analyzing behavioral biometric data for a user entering log-in information while positioned in various physical positions and/or orientations.

Consistent with the technology disclosed herein, a system may include one or more memory devices storing instructions and one or more processors configured to execute the instructions to perform steps of a method. The system may execute the instructions to receive, from a user device, behavioral biometric data indicative of a current entry of authentication credentials (e.g., a log-in attempt) on the user device, and the behavioral biometric data may comprise current entry time data indicative of a period of time associated with entry of the current entry of authentication credentials. The system may compare the received behavioral biometric data to a first user model that comprises first model time data and is based at least in part on stored behavioral biometric data personalized to a user of the user device. Responsive to determining, based on the comparison, that a level of similarity between the received behavioral biometric data and the first user model is above a first predetermined threshold, the system may determine that the user device meets a secondary authentication requirement. Responsive to determining that the level of similarity is below the first predetermined threshold and a second predetermined threshold, the system can initiate a secondary authentication method and associate the received behavioral biometric data with a second user model.

Consistent with the technology disclosed herein, a method may include receiving, from a user device, one or more submissions comprising authentication credentials (e.g., a log-in attempt) and scenario data comprising device elevation data and device orientation data, the scenario data being detected, by one or more sensors of the user device, contemporaneously with a corresponding entry of the authentication credentials. The method may include determining, based on the submission of the authentication credentials, one or more user models personalized to a user associated with the user device and associating each of the one or more user models with a use-pose of a user using the user entering the authentication credentials. The method may include receiving, from the user device, a current submission comprising current authentication data indicative of a current entry of the authentication credentials and current scenario data comprising current device elevation data, and current device orientation data. The method may include, for each of the one or more user models, determining a level of similarity based on a comparison of the current authentication data to the corresponding user model of the one or more user models. The method may include, responsive to determining that the level of similarity corresponding to at least one user model of the one or more user models is above a predetermined threshold, determining that the user meets a secondary authentication requirement.

Further features of the disclosed design, and the advantages offered thereby, are explained in greater detail hereinafter with reference to specific implementations illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
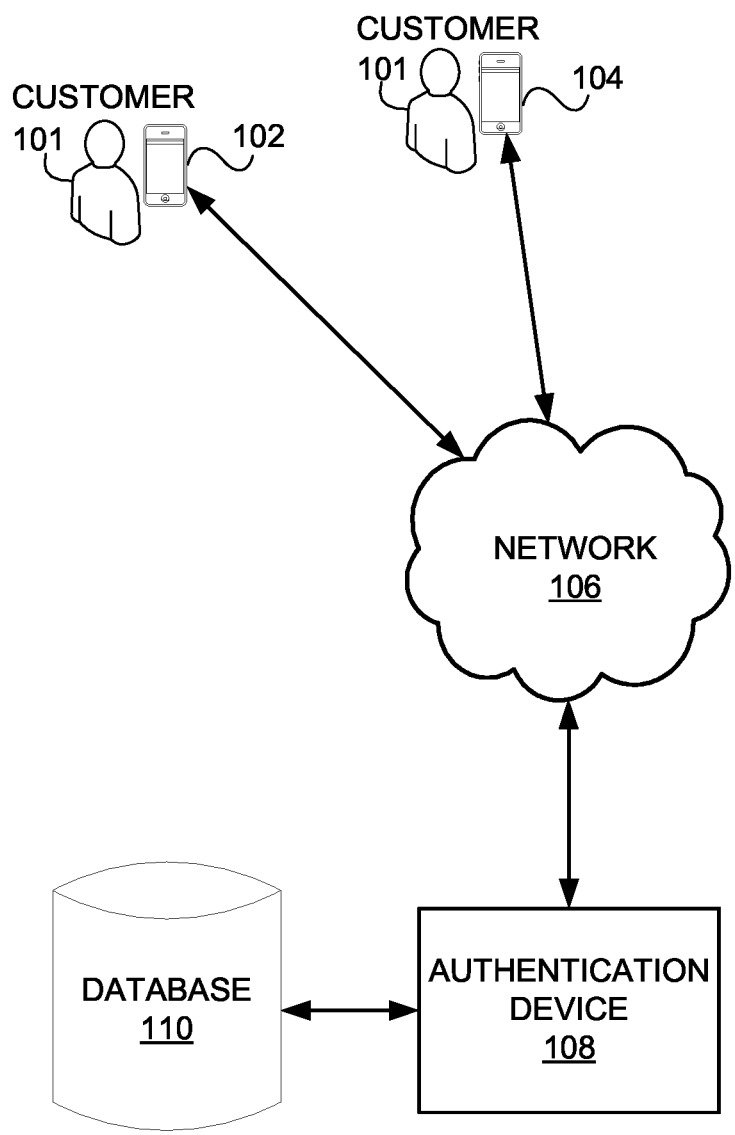
FIG. 1 is a diagram of an example behavioral biometrics authentication system, in accordance with the presently disclosed technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed technology includes systems and methods for monitoring and analyzing behavioral biometric data for a user. Behavioral biometric data may include keystroke dynamics associated with a user's typing (e.g., while inputting log-in information) including amount of time associated with data input (e.g., amount of time associated with inputting a username and/or a password), latency between consecutive keystrokes, flight time, dwell time, timing of a user's key press (i.e., amount of time associated with a downstroke or pressing action on a key, amount of time associated with a key in the down position, and amount of time associated with an upstroke or releasing action on a key), overall typing speed, frequency and/or number of errors (e.g., frequency within which the user uses the backspace and/or delete keys), and/or frequency of use of control keys (e.g., left control key, right control key, left alt key, right alt key, left shift key, right shift key, enter key). Behavioral biometrics may also include the type of input errors associated with a particular user. For example, a user may often capitalize the first two letters of a word instead of capitalizing only the first letter of a word (e.g., a user types "TUesday" instead of "Tuesday"), which may be indicative of, as a nonlimiting exampling, the user being slow to release the shift key as compared to the speed of pressing other keys. As additional examples, a user may often capitalize only the second letter of a word instead of capitalizing only the first letter, or a user may often fail altogether to capitalize words that should be capitalized (e.g., a user types "tuesday").

The disclosed technology can include monitoring and analyzing the user's behavioral biometric data across various computing devices, operating systems, and other environments. For example, a system may be configured to detect behavioral biometric data from data input devices and/or one or more sensors. The system may be configured to receive detected behavioral biometric data and compare the detected behavioral biometric data to saved behavioral biometric data associated with a user and determine, based on the comparison, a degree of similarity of the detected behavioral biometric data with respect to the saved behavioral biometric data. The system may be configured to, responsive to determining that the similarity score is above a predetermined threshold, determine that the detected behavioral biometric data is indicative of the user entering log-in information via a certain data entry method, on a certain computing device, and/or in a certain physical position or orientation.

The disclosed technology can include a system configured to monitor and analyze the behavioral biometric data corresponding to the user entering log-in information via multiple entry methods (e.g., manually typing or otherwise inputting the log-in information, automatic entry provided by a password manager tool or application, inputting information via an onscreen keyboard, inputting information via a physical keyboard). The system can maintain a first user model corresponding to a user entering log-in information via a first entry method. The system can receive detected behavioral biometric data associated with a user's log-in attempt and determine that the detected behavioral biometric data is not indicative of the user entering the log-in information via the first entry method (e.g., by determining that the similarity score of the detected behavioral biometric data is below a first predetermined threshold).

Responsive to determining that the detected behavioral biometric data is below a second predetermined threshold, the system can be configured to determine that the detected behavioral biometric data corresponds to the user having entered the log-in information via a second entry method different from the first entry method associated with the first user model, and the system can initiate a secondary authentication method (e.g., asking the user to answer one or more secret questions or retrieve and submit a one-time password or security code) and can establish a second user model associated with the user, associating the detected behavioral biometric data with the second user model. The system can maintain the first and second user models in parallel and any subsequently detected behavioral biometric data can be compared to one or both of the first and second user models. Upon determining that detected behavioral biometric data matches the first or second user model, the system can integrate the detected behavioral biometric data into the first or second user model, which may improve the accuracy of the model data. The system may determine an average of stored behavioral biometric data for a given user model, may determine a running average of stored behavioral biometric data for a given user model, or may use other statistical analyses of the stored behavioral biometric data to provide a representation of expected behavioral biometric data associated with the corresponding model. Upon determining that the detected behavioral biometric data does not match the first or second user model (e.g., determining that the detected behavioral biometric data is below a predetermined threshold of similar with respect to the first and second user models), the system can be configured to initiate the same or another secondary authentication method and establish a third user model associated with the user, associating the detected behavioral biometric data with the third user model. The system can be configured to maintain multiple user models for a given user corresponding to respective data entry methods, types of computing devices, physical positions of the user while inputting log-in information, and other differentiating aspects related to data entry.

The system may be configured to receive, along with the behavioral biometric data, a device identifier indicative of a make and/or model of the computing device on which the user entered the log-in information associated with the behavioral biometric data. The system may be configured to compare the device identifier to one or more saved device identifiers associated with respective user data models. Each user data model may be associated with a particular computing device, a particular manufacturer of computing device, and/or a particular model of computing device. If the received device identifier does not match a saved device identifier, the system may be configured to initiate a secondary authentication method and establish a new user model (e.g., second user model) associated with the user, associating the detected behavioral biometric data with the new user model.

The disclosed technology can include monitoring and analyzing the behavioral biometric data for a user entering log-in information while the user is positioned in various physical positions and/or orientations, including but not limited to a prone position, a supine position, a Fowler's position (i.e., a user seated in a semi-upright sitting position with the head and trunk raised to an angle between approximately 45 degrees and approximately 60 degrees relative the horizontal), or a semi-Fowler's position (i.e., a user positioned on the user's back with the head and trunk raised to an angle between approximately 15 degrees and approximately 45 degrees relative the horizontal), a standing position, a seated position, a squatting position, and a hunched position. The system can receive spatial sensor data from one or more spatial sensors of the computing device on which the user entered the log-in information associated with the behavioral biometric data. The system can compare the spatial sensor data to position data (e.g., saved in a user position database), and based on the comparison, the system can determine a physical position of the user while the log-in information was entered. The system can track physical positions likely to be used by the user while inputting log-in information on a given user device, using a given input method, at a given geographic location, and/or at a given time of day (or during a given range of times of day). The system may maintain a user model indicative of one or more physical positions of the user while inputting log-in information and/or indicative of a likelihood that the user entered log-in information while in a given physical position or orientation.

While certain examples and implementations of the disclosed technology may be referenced herein as a given system or method, it is contemplated that these various examples and implementations may be also implemented with identical or substantially similar features as a system, a method, or a non-transitory, computer-readable medium storing instructions that, when executed by a processor, cause the processor to perform steps of a method.

Reference will now be made in detail to example implementations of the disclosed technology, which are illustrated in the accompanying drawings and disclosed herein. Wherever convenient, the same references numbers will be used throughout the drawings to refer to the same or like parts.

FIG. 1 is a diagram of an example system 100 that may be configured to perform one or more processes that may authenticate a user 101. As will be appreciated, the systems and methods discussed herein (e.g., system 100) may be particularly useful for providing secondary authentication, such as in addition to the correctness of inputted log-in information. The components and arrangements shown in FIG. 1 are not intended to limit the disclosed technology, as the components used to implement the disclosed processes and features may vary. As shown, system 100 may include first user device 102 and second user device 104 connected to an authentication device 108 via a network 106. Authentication device 108 may be connected to a database 110, which may include a user model database, a user position database, or other information.

Authentication device 108 may be associated with an entity such as a business, corporation, individual, partnership, or any other entity that may be a seller of good and/or services such as a grocery store, a movie theater, a gas station, or the like. Authentication device 108 may be associated with an entity such as a business, corporation, individual, partnership, or any other entity that may provide financial services or processing of financial transactions such as a bank, a credit card company or the like. Authentication device 108 may be associated with an entity that provides goods and services.

Figure 2:
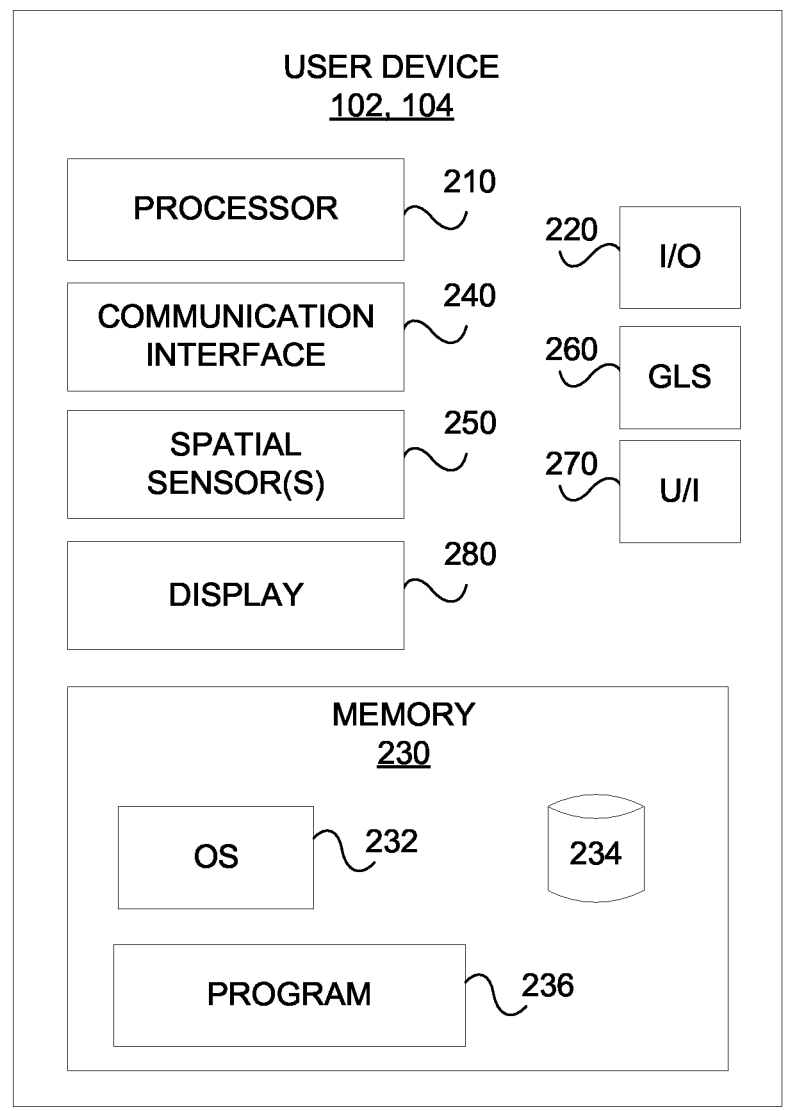
FIG. 2 is a component diagram of an example user device, in accordance with the presently disclosed technology.

A customer 101 may operate first user device 102 or second user device 104. First and second user devices 102, 104 can be different devices, and either user device 102, 104 can include a mobile device, smart phone, general purpose computer, tablet computer, laptop computer, telephone, PSTN landline, smart wearable device, voice command device, other mobile computing device, or any other device capable of communicating with network 106 and/or with authentication device 108. User device 102, 104 may include or incorporate electronic communication devices for hearing or vision impaired users. First and second user device 102, 104 may belong to or be provided by user 101, or may be borrowed, rented, or shared. User 101 may include an individual such as, for example, a subscriber, client, prospective client, or customer of an entity associated with authentication device 108. Referring to FIG. 2, first and second user devices 102, 104 may include a processor 210; an input/output (I/O) device 220 such as a transceiver for sending and receiving data (e.g., via Wi-Fi, cellular communications, near-filed communications, Bluetooth™, and the like); a memory 230, which may include an operating system (OS) 232, a storage device 234, which may be any suitable repository of data, and/or a program 236; and a communication interface 240. First and second user device 102, 104 may include components such as one or more spatial sensors 250 (e.g., accelerometer, gyroscope, piezoelectric sensor, piezoresistive sensor, infrared sensor, laser and/or Lidar, barometer, altimeter); a geolocation sensor (GLS) 260 for determining the geographic location of first or second user device 102, 104; a user interface (U/I) device 270 for receiving user input data; such as data representative of a click, a scroll, a tap, a press, or typing on an input device that can detect tactile inputs (e.g., a physical keyboard, a virtual keyboard); a display 280; a microphone; and/or an image capture device, such as a digital camera.

Network 106 may be of any suitable type, including individual connections via the internet such as cellular or WIFI networks. Network 106 may connect terminals, services, and mobile devices using direct connections such as radio-frequency identification (RFID), near-field communication (NFC), Bluetooth™, low-energy Bluetooth™ (BLE), Wi-Fi™, ZigBee™ ambient backscatter communications (ABC) protocols, USB, WAN, or LAN. Because the information transmitted may be personal or confidential, security concerns may dictate one or more of these types of connections be encrypted or otherwise secured. Should the information being transmitted be less personal, however, the network connections may be selected for convenience over security.

Network 106 may comprise any type of computer networking arrangement used to exchange data. For example, network 106 may be the Internet, a private data network, a virtual private network using a public network, and/or other suitable connection(s) that enables components in system environment 100 to send and receive information between the components of system 100. Network 106 may also include a public switched telephone network ("PSTN") and/or a wireless network.

Figure 3:
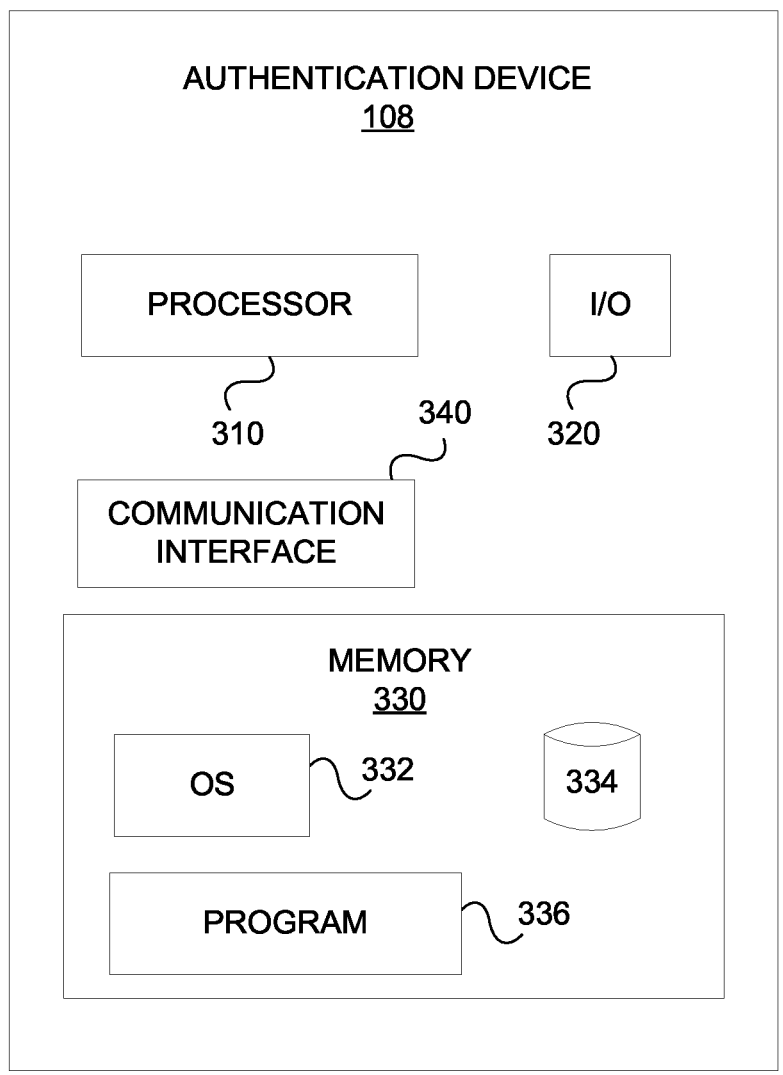
FIG. 3 is a component diagram of an example authentication device, in accordance with the presently disclosed technology.

Referring to FIG. 3, authentication device 108 may include a processor 310; an input/output (I/O) device 320 such as a transceiver for sending and receiving data (e.g., via Wi-Fi, cellular communications, near-filed communications, Bluetooth™, and the like); a memory 330, which may include an operating system (OS) 332, a storage device 334, which may be any suitable repository of data, and/or a program 336; and a communication interface 340. Authentication device 108 may be in communication with one or more servers, devices, and computer systems for performing one or more functions associated with products and/or services provided by the entity associated with authentication device 108. Such servers, devices, and computer systems may include, for example, a web server, transaction server, or any other computer systems necessary to accomplish tasks associated with the entity or the needs of users (which may be user 101).

Authentication device 108 may further include a peripheral interface, a bus configured to facilitate communication between the various components of authentication device 108, and a power source configured to power one or more components of the authentication device 108. A peripheral interface may include hardware, firmware and/or software that enables communication with various peripheral devices, such as media drives (e.g., magnetic disk, solid state, or optical disk drives), other processing devices, or any other input source used in connection with the instant techniques. The peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof. Communication interface 340 may provide access to a cellular network, the Internet, a local area network, or another wide-area network. Communication interface 340 may include hardware, firmware, and/or software that allows the processor(s) 310 to communicate with other devices via wired or wireless networks, whether local or wide area, private or public, as known in the art. The power source may be configured to provide an appropriate alternating current (AC) or direct current (DC) to power components.

Processor 310 may include one or more of a microprocessor, microcontroller, digital signal processor, co-processor or the like or combinations thereof capable of executing stored instructions and operating upon stored data. Memory 330 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. The processing techniques described herein are implemented as a combination of executable instructions and data within the memory 330.

Processor 310 may be one or more known processing devices, such as a microprocessor from the Pentium™ family manufactured by Intel™ or the Turion™ family manufactured by AMD™. Processor 310 may constitute a single core or multiple core processor that executes parallel processes simultaneously. For example, processor 310 may be a single core processor that is configured with virtual processing technologies. Processor 310 may use logical processors to simultaneously execute and control multiple processes. Processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Authentication device 108 may include one or more storage devices configured to store information used by processor 310 (or other components) to perform certain functions related to the disclosed technology. Authentication device 108 may include memory 330 that includes instructions to enable processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

Authentication device 108 may include memory 330 that includes instructions that, when executed by processor 310, perform one or more processes consistent with the functionalities disclosed herein. Methods, systems, and articles of manufacture consistent with disclosed technology are not limited to separate programs or computers configured to perform dedicated tasks. For example, authentication device 108 may include memory 330 that may include one or more programs 336 to perform one or more functions of the disclosed technology. Moreover, processor 310 may execute one or more programs 350 located remotely from system 100. For example, system 100 may access one or more remote programs 336, that, when executed, perform functions related to disclosed technology. Authentication device 108 may include a customer identification program 336 that is a rules-based program for monitoring and analyzing behavioral biometrics associated with a user according to one or more of the processes and functionalities described herein.

Memory 330 may include one or more memory devices that store data and instructions used to perform one or more features of the disclosed technology. Memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 330 may include software components that, when executed by processor 310, perform one or more processes consistent with the disclosed technology. In some technology, memory 330 may include a database 334 for storing related data to enable authentication device 108 to perform one or more of the processes and functionalities described herein.

Authentication device 108 may also be communicatively connected to one or more memory devices (e.g., databases) locally or through a network. The remote memory devices may be configured to store information and may be accessed and/or managed by authentication device 108. By way of example, the remote memory devices may be document management systems, Microsoft™ SQL database, SharePoint™ databases, Oracle™ databases, Sybase™ databases, or other relational or non-relational databases. Systems and methods consistent with disclosed technology, however, are not limited to separate databases or even to the use of a database.

Authentication device 108 may also include one or more I/O devices 320 that may comprise one or more interfaces for receiving signals or input from devices and providing signals or output to one or more devices that allow data to be received and/or transmitted by authentication device 108. For example, authentication device 108 may include interface components, which may provide interfaces to one or more input devices, such as one or more keyboards, mouse devices, touch screens, track pads, trackballs, scroll wheels, digital cameras, microphones, sensors, and the like, that enable authentication device 108 to receive data from one or more users.

Authentication device 108 may include any number of hardware and/or software applications that are executed to facilitate any of the operations. The one or more I/O interfaces 320 may be utilized to receive or collect data and/or user instructions from a wide variety of input devices. Received data may be processed by one or more computer processors as desired in various implementations of the disclosed technology and/or stored in one or more memory devices.

While first user device 102, second user device 104, and authentication device 108 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of first user device 102, second user device 104, and authentication device 108 may include a greater or fewer number of components than those illustrated.

Authentication device 108 may be configured to store, maintain, and update user model data and/or user-specific behavioral biometric profiles. Authentication device 108 may be configured to store data in database 110, which may include one or more databases associated with user log-in information (e.g., usernames and associated passwords) and/or one or more databases associated with behavioral biometric data of one or more users (e.g., a user model database, a user position database). Database 110 may also serve as a back-up storage device and may contain data and information that is also stored on, for example, local databases associated authentication device 108 or servers associated with the entity. Database 110 may be accessed by other devices (e.g., authentication device 108) and may be used to store information relating to user-specific behavioral biometric data, user-specific device information, user-specific-location information, and other information related to behavioral biometrics.

Authentication device 108 may be configured to receive data or other communication from first or second user devices 102, 104. For example, authentication device 108 may be configured to receive log-in information and/or behavioral biometric data associated with a log-in attempt by user 101 on first user device 102 (or second user device 104), a device identifier associated with first user device 102 (or second user device 104), spatial sensor data from one or more spatial sensors 250 of first user device 102 (or second user device 104), and/or other data or information from first user device 102 (or second user device 104). Authentication device 108 may be configured to determine the correctness of received log-in information by comparing the received log-in information to saved log-in information to determine whether the received log-in information matches the saved log-in information. Alternately or in addition, a separate server, computing device, or other device associated with the entity may be configured to determine the correctness of received log-in information. Authentication device 108 may be configured to compare the received device identifier with one or more stored device identifiers to identify a user model associated with the stored device identifier.

It may be useful to locally store the user model data and/or user-specific behavioral biometric profiles on the first user device 102 and/or second user device 104, as opposed to storing this data at remote location (e.g., a remote database 110). Storing the user model data and/or user-specific behavioral biometric profiles locally may provide additional security and help alleviate privacy concerns. In such a local storage configuration, the local storage (e.g., at the first user device 102 and/or second user device 104) may include user model data and/or user-specific behavioral biometric profiles related to only the device associated with the local storage, or the local storage may include user model data and/or user-specific behavioral biometric profiles related to a plurality of devices (e.g., data corresponding to both the first user device 102 and the second user device 104). Locally storing data for only a device associated with the local storage may better ensure data security, whereas locally storing data associated with multiple devices may provide more robust and complete models and/or profiles. In configurations where the local storage includes data associated with multiple devices, one, some, or all of the devices may be configured to transmit data to a designated central device that includes the local storage including all model and/or profile data, or one, some, or all of the devices may be configured to share all model and/or profile data among all or a subset of the devices.

Each user model may include data for one or more types of behavioral biometrics associated with a user and/or user device (e.g., the amount of time associated with a particular data input, latency between consecutive keystrokes, flight time, dwell time, timing of a user's key press, overall typing speed, frequency and/or number of errors, and/or frequency of use of control keys, the type of input errors). While some types of behavioral biometrics may refer to a single value (e.g., average typing speed, average latency between consecutive keystrokes), the user models may include data corresponding to the temporal and/or locational aspects of some or all characters of a user input (i.e., with respect to consecutive, successive, neighboring, or other characters of a user input). For example, the model may include data indicative of a user's 101 tendency to mistype a particular word in a particular way, or a user's 101 tendency to input certain consecutive or successive characters at a faster or slower rate than average when those characters are input in a certain order. The user model may include data indicative of when a user tends to correct an error. For example, a user 101 may tend to immediately correct a typographical error (e.g., before continuing to type a word), or the user 101 may complete typing a word before correcting the error (e.g., by backspacing through correctly types characters, by using the back-arrow key to navigate to the error and correcting only the error).

Authentication device 108 may be configured to compare the received behavioral biometric data to saved behavioral biometric data of a first user model to determine a degree of similarity of the detected behavioral biometric data with respect to the saved behavioral biometric data. Authentication device 108 may be configured to determine that the behavioral biometric data is authenticated if the degree of similarity is above a first predetermined threshold. Thus, if the user-entered log-in information is deemed correct (by authentication device 108 or some other device), authentication device 108 may be configured to provide secondary authentication based on the behavioral biometric data.

If the degree of similarity is above the first predetermined threshold, authentication device 108 may be configured to update the first user model to include the received behavioral biometric data. Authentication device 108 may be configured to average the received behavioral biometric data with already-stored behavioral biometric data of the first user model. Alternately, authentication device 108 may be configured to determine a running average of behavioral biometric data associated with the first user model. This may provide a decreased amount of data as compared to determining the average of all received behavioral biometric data but may also provide increased accuracy of user's 101 recent behavioral biometrics. For example, as user 101 commits a particular password to muscle memory, user 101 may type that password at a faster rate over time and/or with fewer errors, and determining a running average of behavioral biometric data may enable the authentication device 108 to determine if any received behavioral biometric data is indicative of recent behavioral biometrics of user 101.

If the degree of similarity is below the first predetermined threshold, authentication device 108 may be configured to determine that the received behavioral biometric is not indicative of behavioral biometric data associated with the first user model. Responsive to determining that the degree of similarity is below the first predetermined threshold, authentication device 108 may initiate a secondary authentication method such as transmitting, to the first user device 102, a request for secondary authentication credentials (e.g., asking the user to answer one or more secret questions).

If the degree of similarity is also below a second predetermined threshold, authentication device 108 may be configured to determine that the received behavioral biometric data is indicative of user 101 entering log-in information on a device different than first user device 102, such a second user device 104. Authentication device 108 may be configured to determine that the received behavioral biometric data is indicative of user 101 entering log-in information on a same user device 102, 104 using different input methods (e.g., virtual keyboard and physical keyboard). This determination may be based on the premise that stark and/or drastic differences between received behavioral biometric data and stored behavioral biometric data may be indicative of user 101 entering the log-in information from a user device different from the user device associated with the first user model, a data entry method different from the data entry method associated with the first user model, or some other differentiating aspect. Examples of differentiating factors between user models for a single user 101 include: different types of devices (e.g., first user device 102 and second user device 104), particularly if the devices include different data input interfaces (e.g., a physical keyboard or keypad, a virtual U/I, such as via a touch-sensitive display), different devices that are the same type of device but are running different OSs 332 or different versions of a same OS 332, same or different devices using different orientations of a data input interface (e.g., the same smart phone with one log-in attempt being made on a virtual keyboard while the smart phone is in a landscape orientation and another log-in attempt being made on a virtual keyboard while the smart phone is in a portrait orientation), different input methods (e.g., manually typing log-in information, inputting log-in information via a speech recognition tool, automatically inputting log-in information via a password manager tool). As a specific example, the first user model may be associated with first user device 102, which is an iPhone™ smart phone, and user 101 may have entered the log-in information via second user device 104, which is an Android™ smart phone. As another specific example, the first user model may be associated with first user device 102, which includes a virtual keyboard, and user 101 may have entered the log-in information via second user device 104, which includes a physical keyboard or keypad. As specific another example, the first user model may be associated with the first user device 102 and user 101 manually typing the log-in information, whereas the received behavioral biometric data is associated with first user device 102 and a password management tool automatically entering the log-in information, or vice versa.

If the received behavioral biometric data is below the second predetermined threshold, authenticating device 108 may be configured to generate a second user model associated with user 101 and associate the received behavioral biometric data with the second user model. During a subsequent log-in attempt by user 101, authenticating device 108 may be configured to compare the subsequently received log-in information with the first user model and the second user model. If the subsequently received behavioral biometric data is above the first predetermined threshold of similarity with respect to the first user model or the second user model, authentication device 108 may be configured to determine that the subsequently received behavioral biometric data is authenticated, and authentication device 108 may be configured to not initiate a secondary authentication method. If the subsequently received behavioral biometric data is below the first predetermined threshold of similarity with respect to both the first user model and the second user model, authentication device 108 may be configured to initiate a secondary authentication method. If the subsequently received behavioral biometric data is below the first predetermined threshold of similarity with respect to both the first user model and the second user model, authentication device 108 may be configured to generate a third user model, as described above with respect to the second user model.

Authentication device 108 may be configured to discard outdated user models. For example, authentication device 108 may be configured to delete or discard a particular user model if a predetermined period of time has passed since the last time that received behavioral biometric data has been above the first predetermined threshold of similarity to the particular user model. As another example, authentication device 108 may be configured to delete or discard a particular user mode if behavioral biometric data associated with a predetermined number of log-in attempts has been received with none of the log-in attempts including behavioral biometric data that is above the first predetermined threshold of similarity to the particular user model.

Authentication device 108 may be configured to discard a user model upon receiving input from the corresponding user 101 that the user model is not indicative of data inputted by the user 101. For example, authentication processor 108 may be configured to notify the user 101 when a new user model is generated, such as transmitting a notification that the authentication device 108 has detected a new login attempt, a new type of login attempt, or the like, and the authentication device 108 may receive a response from the user 101 indicating that the login attempt was not associated with a login attempt performed by the user 101. Upon receiving such information from user 101, authentication device 108 may be configured to discard the corresponding user model.

Authentication device 108 may be configured to merge two or more user models into a single user model. Authentication device 108 may be configured to compare the various user models associated with a given user 101 to one another and determine a degree of similarity for two or more user models. If the degree of similarity of two or more user models is above a predetermined threshold (e.g., 85% similar, 90% similar, 93% similar, 95% similar, 98% similar), authentication device 108 may be configured to merge all data from the two or more user models into a single user model. Thus, authentication device 108 may be configured to eliminate redundant models without losing any previously accrued data associated with those models.

Authentication device 108 may be configured to monitor and analyze spatial sensor data from one or more user devices 102, 104 to detect emergent patterns in how a user 101 uses the user device 102, 104 while entering log-in information. That is, authentication device may be configured to receive sensor data from a user device 102, 104 and determine, based on the sensor data, a physical position or orientation of the user 101 while the user 101 entered the log-in information via the user device 102, 104. As will be appreciated, a user 101 may tend to adjust to different physical positions or orientations based on the types of device being used to enter log-in information. For example, a user 101 may tend to use a laptop computer in a certain position, a smart phone in a different certain position, a tablet computer in yet a different certain position, and a wearable smart device (e.g., smart watch) in yet a different certain position. Non-limiting examples of physical positions include a prone position, a supine position, a Fowler's position (i.e., a user seated in a semi-upright sitting position with the head and trunk raised to an angle between approximately 45 degrees and approximately 60 degrees relative the horizontal), or a semi-Fowler's position (i.e., a user positioned on the user's back with the head and trunk raised to an angle between approximately 15 degrees and approximately 45 degrees relative the horizontal), a standing position, a seated position, a squatting position, and a hunched position. Moreover, a user 101 may tend to use different user devices 102, 104 based on the time of day, day of the week, geographic location (e.g., at work, at home), and other factors. Similarly, a user 101 may tend to use a single user device 102, 104 (or type of user device) differently based on at least these same factors. For example, a user 101 may tend to use a laptop computer primarily in a seated position during the day or while at work, and the user 101 may tend to use the same laptop computer while in a prone position or semi-Fowler's position during evening hours or while at home (which may be indicative of, for example, the user 101 using the laptop computer while lying in bed or reclined on a sofa).

Authentication device 108 (or user device 102, 104) may be configured to determine the physical position of the user based on data from one or more spatial sensors 250. For example, accelerometer data from an accelerometer, gyroscope data from a gyroscope, and elevation data from an altimeter or similar device can be used alone or together to determine movement of the user device 102, 104 or an angle of the user device 102, 104 (e.g., relative to the direction of gravity, relative to the ground). A standing position may include elevation data that indicates a high position relative to elevation data corresponding to a seated position or a prone position. The angle of the user device 102, 104 may be different for a device 102, 104 in a semi-Fowler's position than for the same device 102, 104 in a seated position. Each type of device may be associated with a predetermined range of values for each type of spatial sensor 250 and for each physical position.

Authentication device 108 (or user device 102, 104) can be configured to implement a baseline mode wherein authentication device 108 (or user device 102, 104) identifies a range of values for each type of spatial sensor 250 of a given device and for each physical position. For example, authentication device 108 (or user device 102, 104) may be configured to periodically provide a request for the user to indicate what position he or she is currently in such that authentication device 108 (or user device 102, 104) can formulate a baseline range of values for each type of spatial sensor 250 of a given device and for each physical position. Authentication device 108 (or user device 102, 104) may be configured to periodically update the baseline or predetermined ranges of values based on feedback from the user.

In addition to indicating a physical position or orientation of user 101, spatial sensor data may be indicative of a physical position or orientation of the corresponding user device (e.g., user device 102, 104). For example, spatial sensor data may be indicative of a direction in which a display of the user device 102, 104 is directed, an angle at which the user device 102, 104 is disposed while log-in information is being inputted, or other data indicative of the physical position or orientation of the user device 102, 104.

By determining the likelihood that scenario-specific data (i.e., the likelihood that user 101 will user a corresponding user device 102, 104 to input log-in information at a given time while user 101 is in a given physical position or orientation and/or while the user device 102, 104 is in a given physical position or orientation) will occur and comparing received scenario data (i.e., a received device identifier, received spatial sensor data (e.g., data from one or more of an accelerometer, gyroscope, piezoelectric sensor, piezoresistive sensor, infrared sensor, laser sensor, Lidar sensor, barometer, and/or altimeter), received behavioral biometric data, received or determined time data, and/or received GLS data) to saved scenario data (i.e., a saved device identifier, saved spatial sensor data, saved behavioral biometric data, saved time data, and/or saved GLS data), authentication device 108 may be configured to determine that a corresponding log-in attempt is authenticated via the received scenario data. Thus, scenario-specific data may provide secondary authentication to reinforce a primary authentication of received log-in information (e.g., determining that a received username and password match a stored username and password).

Authentication device 108 may be configured to initially determine a user model based solely on login attempts made by a user 101 during the normal course of user operations (e.g., data is added to the user model based on each corresponding login attempt). This may provide accurate data related to actual login attempt scenarios, but this may also result a large amount of time to accrue an amount of data needed to provide an accurate user model. Authentication device 108 may be configured to initially determine a user model based solely on requested data reflective of login attempts. Alternately, this step may be achieved locally, such as on user device 102, 104, which may be particularly useful when model and/or profile data is stored locally. For example, authentication device 108 may be configured to transmit one or more requests to the user 101 to provide sample input information to use as initial data for generating a user model (e.g., requesting the user 101 to input her username and password a predetermined number of times, such as five times or ten times; requesting the user 101 to input sample information, such as inputting predetermining information, which may include the user's 101 address or phone number or may include a predetermined sentence or passage). This method may provide data faster but may also provide data that is less accurate as compared to actual login attempt scenarios. For example, this method may be less accurate because this method may include the user 101 inputting data that is different from the login information and/or inputting login information in a repeated, artificial environment (i.e., not during the normal course of user operations).

Authentication device 108 may be configured to receive first scenario data from a first user device 102, and the first scenario data may correspond to a first log-in attempt. Authentication device 108 may be configured to detect, based on the received first scenario data, patterns or trends in scenario data that are specific to user 101 and/or first user device 102. Authentication device 108 may be configured to receive second scenario data from a second user device 104, and the second scenario data may correspond to a second log-in attempt. Authentication device 108 may be configured to receive time data indicative of a time of day and/or day of the week during which each log-in attempt occurred (i.e., the time corresponding to a given set of behavioral biometric data and/or spatial sensor data), or authentication device 108 may be configured to determine a time of day and/or day of the week during which each set of behavioral biometric data and/or spatial sensor data was received. Authentication device 108 may be configured to identify each device 102, 104 (and/or the corresponding type of device) by a received device identifier included in the corresponding scenario data. Authentication device 108 may be configured to store (e.g., in database 110) a user model corresponding to scenario data received from each specific device 102, 104. For example, authentication device 108 may store a first user model corresponding to scenario data received from the first user device 102 and a second user model corresponding to scenario data received from the second user device 104. As another example, authentication device 108 may store a first user model and a second user model corresponding to scenario data received from the first user device 102 (e.g., data indicative of user 101 using first user device 102 in a first and second physical position, respectively) and a third user model corresponding to scenario data received from the second user device 104.

Alternately, authentication device 108 may store a single user model for a given user device 102, 104, and each user model may include scenario data corresponding to one or more physical positions or orientations of user 101, one or more physical positions or orientations of the corresponding user device 102, 104, one or more geographic locations, and/or a time of log-in attempt associated with each set of spatial sensor data and/or behavioral biometric data. Authentication device 108 may be configured to generate and maintain the user model to identify emergent patterns to determine a likelihood that a give scenario will occur (i.e., user 101 will use a given user device to input log-in information at a given time while user 101 is in a given physical position or orientation and/or while user device 102, 104 is in a given physical position or orientation). For example, the user model may include data indicative of a first likelihood of a first scenario (e.g., the likelihood that user 101 will use first user device 102 to input log-in information between 8:00 am and 5:00 pm on weekdays while user 101 is in a seated position) and a second likelihood of a second scenario (e.g., the likelihood that user 101 will use first user device 102 to input log-in information between 9:00 pm and 10:00 pm on weekdays while user 101 is in a prone position, a supine position, a Fowler's position, or a semi-Fowler's position).

Alternately, authentication device 108 may store a single user model for a given user 101. For example, the user model may include data indicative of a first likelihood of a first scenario (e.g., the likelihood that user 101 will use first user device 102 to input log-in information between 8:00 am and 5:00 pm on weekdays while user 101 is in a seated position) and a second likelihood of a second scenario (e.g., the likelihood that user 101 will use first user device 102 to input log-in information between 9:00 pm and 10:00 pm on weekdays while user 101 is in a prone position, a supine position, a Fowler's position, or a semi-Fowler's position), and the user model may also include data indicative of a third likelihood of a third scenario (e.g., the likelihood that user 101 will use second user device 104 to input log-in information between 12:00 pm and 1:00 pm on weekdays while user 101 is in a standing position or at any time during the weekend and while user 101 is in any position). Thus, a single user model for a given user 101 may include scenario data for multiple scenarios including a plurality of user devices 102, 104 used at a plurality of times while user 101 is in a plurality of physical positions or orientations and/or while user device 102, 104 is in a plurality of physical positions or orientations.

Authentication device 108 may be configured to store one or more sets of stored scenario data (stored device identifiers, stored spatial sensor data, stored behavioral biometric data, stored time data, and/or stored GLS data) in database 110 or some other memory location. Alternately, as explained above, the user device 102, 104 may be configured to locally store data, such as the one or more sets of stored scenario data, which may help ensure data privacy. The various stored data may be included in or associated with a corresponding user model. If the determined likelihood for a given scenario (e.g., the likelihood that user 101 will user the corresponding user device 102, 104 to input log-in information at a given time while user 101 is in a given physical position or orientation and/or while the user device 102, 104 is in a given physical position or orientation) is a above a predetermined threshold, authentication device 108 may be configured to compare the received device identifier, received spatial sensor data, received behavioral biometric data, received or determined time data, and/or received GLS data to a stored device identifier, stored spatial sensor data, stored behavioral biometric data, stored time data, and/or stored GLS data. If the degree of similarity for some or all of the data types included in the scenario data are above a predetermined threshold, authentication device 108 may be configured to determine that the log-in attempt is secondarily authenticated. Authentication device 108 may be configured to require at least a predetermined number of data types be above the predetermined threshold of similarity to determine that the log-in attempt is secondarily authenticated. For example, authentication device 108 may be configured to require at least one, two, three, or more data types be above the predetermined threshold of similarity to determine that the log-in attempt is secondarily authenticated. If fewer than the required number of data is above the predetermined threshold of similarity, authentication device 108 may be configured to determine that the log-in attempt is not secondarily authenticated by the received device identifier, received spatial sensor data, received behavioral biometric data, received or determined time data, and/or received GLS data.

Upon determining the degree of similarity for some or all of the data types are above a predetermined threshold, authentication device 108 may be configured to update the user model to include at least some of the received scenario data (e.g., at least the data types of the received scenario data that matches the saved scenario data). Authentication device 108 may be configured to average the received scenario data with already-stored scenario data of the user model. Alternately, authentication device 108 may be configured to determine a running average of scenario data associated with the user model.

Responsive to determining the required number of data types of the received scenario data are not above the predetermined level of similarity with respect to the corresponding types of the saved scenario data, authentication device 108 may be configured to initiate a secondary authentication method (e.g., asking the user to answer one or more secret questions). Responsive to determining the required number of data types of the received scenario data are not above the predetermined level of similarity with respect to the corresponding types of the saved scenario data, authentication device 108 may be configured to generate a new user model, similar to the process described above with respect to behavioral biometric data.

As discussed herein, the disclosed technology includes systems and methods for monitoring and analyzing personalized, user-specific data associated with a user's 101 log-in attempts to provide one or more forms of automatic secondary authentication for the log-in attempts. The features and other aspects and principles of the disclosed technology may be implemented in various environments. Such environments and related applications may be specifically constructed for performing the various processes and operations of the disclosed technology or they may include a general-purpose computer or computing platform selectively activated or reconfigured by program code to provide the necessary functionality. Further, the processes disclosed herein may be implemented by a suitable combination of hardware, software, and/or firmware. For example, the disclosed technology may implement general purpose machines configured to execute software programs that perform processes consistent with the disclosed technology. Alternatively, the disclosed technology may implement a specialized apparatus or system configured to execute software programs that perform processes consistent with the disclosed technology. Furthermore, although some disclosed technology may be implemented by general purpose machines as computer processing instructions, all or a portion of the functionality of the disclosed technology may be implemented instead in dedicated electronics hardware.

The disclosed technology also relates to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed technology may execute high level and/or low-level software instructions, such as machine code (e.g., such as that produced by a compiler) and/or high-level code that can be executed by a processor using an interpreter.

Figure 4:
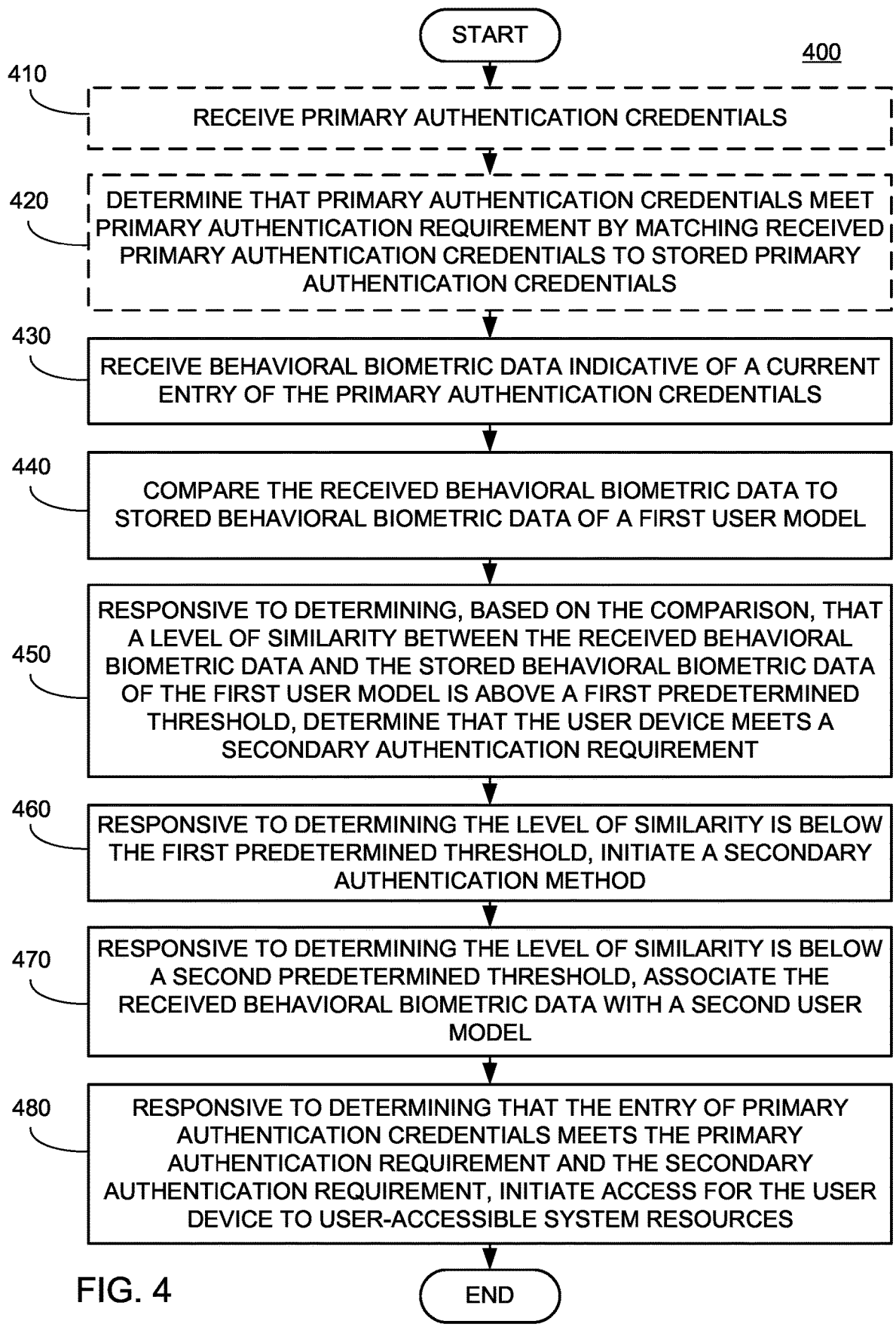
FIG. 4 is a flowchart of an example method for providing automatic secondary authentication of an entry of primary authentication credentials, in accordance with the presently disclosed technology.

FIG. 4 shows a flowchart of a method 400 for providing automatic secondary authentication of an entry of primary authentication credentials. Method 400 may be performed by some or all of user device 102, user device 104, and authentication device 108.

In block 410, the system 100 (e.g., authentication device 108) may receive primary authentication credentials (e.g., log-in information) from a user device (e.g., user device 102, 104). The primary authentication credentials may include, for example, a username and a password for accessing a network, account, service, portal, website, application, or other environment. In block 420, the system 100 may determine that the received primary authentication credentials meet a primary authentication requirement by matching the received primary authentication credentials to stored primary authentication credentials. In block 430, the system 100 can receive behavioral biometric data, and the behavioral biometric data can be indicative of a current entry of the primary authentication credentials. In block 440, the system 100 can compare the received behavioral biometric data to stored behavioral biometric data of a first user model. The system 100 may be configured to compare the received behavioral biometric data to the stored behavioral biometric data in response to determining that the received primary authentication credentials meet the primary authentication requirement.

In block 450, the system 100 may be configured to, responsive to determining, based on the comparison, that a level of similarity between the received behavioral biometric data and the stored biometric data of the first user model is above a first predetermined threshold, determine that the current entry of the primary authentication credentials meets a secondary authentication requirement. In block 460, the system 100 may be configured to initiate a secondary authentication method responsive to determining the level of similarity is below the first predetermined threshold, and in block 470, the system 100 may be configured to, responsive to determining the level of similarity is below a second predetermined threshold, associate the received behavioral biometric data with a second user model. In block 480, the system 100 may be configured to, responsive to determining that the entry of the primary authentication credentials meets the primary authentication requirement and the secondary authentication requirement, initiate access for the user device to user-accessible system resources (e.g., a network, account, service, portal, website, application, or other environment).

Figure 5:
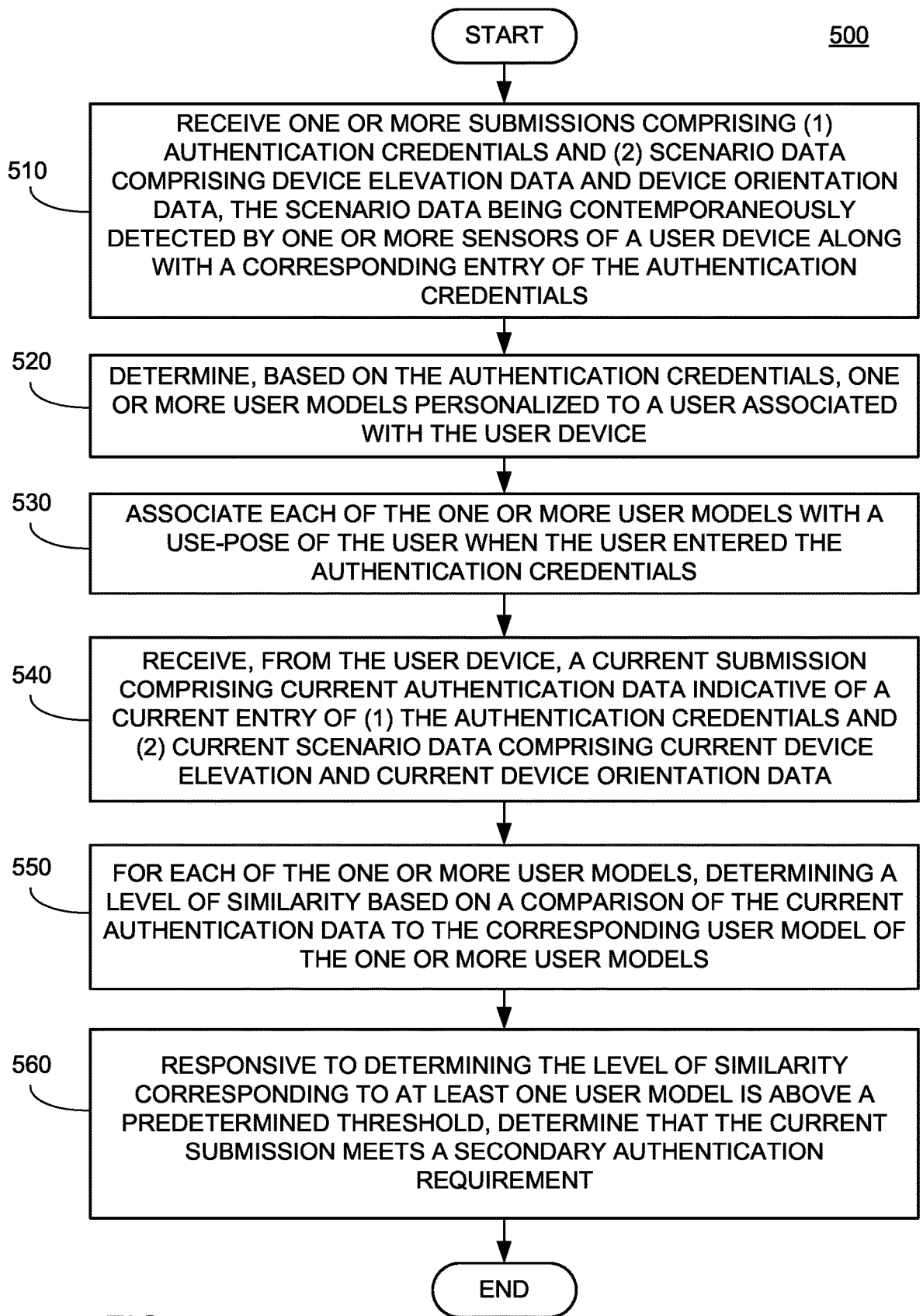
FIG. 5 is a flowchart of an example method for providing automatic secondary authentication of an entry of primary authentication credentials, in accordance with the presently disclosed technology.

FIG. 5 shows a flowchart of a method 500 for providing automatic secondary authentication of an entry of primary authentication credentials. Method 500 may be performed by some or all of user device 102, user device 104, and authentication device 108.

In block 510, the system 100 (e.g., authentication server 108) may receive one or more submissions comprising (i) authentication credentials and (ii) scenario data comprising device elevation data and device orientation data. The scenario data may have been contemporaneously detected by one or more sensors of a user device (e.g., user device 102, 104) as a corresponding entry of the authentication credentials was entered into the user device. In block 520, the system 100 may determine, based on the authentication credentials, one or more user models personalized to a user (e.g., user 101) associated with the user device. In block 530, the system may associate each of the one or more models with a use-pose of the user when the user entered the authentication credentials (e.g., a physical pose of the user as the user entered the authentication credentials).

In block 540, the system 100 may receive, from the user device, a current submission (e.g., a log-in attempt) comprising current authentication data indicative of a current entry of (i) the authentication credentials and (ii) current scenario data comprising current device elevation data and current device orientation data. As will be appreciated current device elevation data and current device orientation data may refer to aspects discussed herein as scenario data. In block 550, for each of the one or more user models, the system 100 may compare the current authentication data to the corresponding user model of the one or more user models, and the system 100 may determine, based on the comparison, a level of similarity between the current authentication data and the corresponding user model. In block 560, the system 100 may be configured to, responsive to determining that the level of similarity is above a predetermined threshold, determine that the current submission meets a secondary authentication requirement.

Certain examples and implementations of the disclosed technology are described above with reference to block and flow diagrams of systems and methods and/or computer program products according to examples or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all (e.g., blocks indicated with dashed lines), according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While disclosure has been described in connection with certain examples, including those presently considered to be the most practical application of the disclosed technology, it is to be understood that this disclosure is not to be limited to the disclosed examples and implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the technology and also to enable any person skilled in the art to practice this technology, including making and using any apparatuses or systems and performing any incorporated methods. The patentable scope of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A user (e.g., user 101) who wants to access user-accessible system resources (e.g., a network, account, service, portal, website, application, or other environment is generally required to provide log-in information (e.g., username and password) to gain access. However, fraudulent users may obtain the user's log-in information, enabling the fraudulent users to access, for example, the user's account within the system resources, which may include sensitive information about the user. The system (e.g., authentication device 108) may receive and authenticate the log-in information. The system (e.g., authentication device 108) may be receive behavioral biometric data associated with the user's entry of the log-in information. The system may, alternately or in addition, receive scenario data indicative of the time and location of the user's entry of the log-in information, as well as the device on which the log-in information was entered and sensor data indicative of a physical position or orientation of the user while the user entered the log-in information and/or a physical position or orientation of the user device while the user entered the log-in information.

The system may compare the received behavioral biometric data and scenario data to stored behavioral biometric data and stored scenario data of a first user model. The system may determine, based on the comparison, a level of similarity between the received behavioral biometric data and the stored biometric data and/or a level of similarity between the received scenario data to the stored scenario data. If the system determines that the level of similarity corresponding to the behavioral data or the scenario data is above a first predetermined threshold, the system may determine that the current entry of the primary authentication credentials meets a secondary authentication requirement. If the system determines that the level of similarity corresponding to the behavioral data or the scenario data is not above a first predetermined threshold, the system may initiate a secondary authentication method. If the system determines that the level of similarity corresponding to the behavioral data or the scenario data is below a second predetermined threshold, the system may associate the received behavioral biometric data or the received scenario data with a second user model, and the system may maintain the first and second user models in parallel going forward. If the system determines that the log-in information is authentication and the secondary authentication requirement is satisfied, the system may initiate access for the user device to user-accessible system resources (e.g., a network, account, service, portal, website, application, or other environment).

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:

1. A system comprising:
   one or more processors; and
   memory having instructions stored thereon that, when executed by the one or more processors, cause the system to:
   receive first behavioral biometric data from a user device, the first behavioral biometric data being associated with an entry of primary authentication credentials on the user device to a first user account;
   compare the first behavioral biometric data to a first user model, the first user model associated with (i) a first user device and (ii) a first credential entry method on the first user device, the first user model being based at least in part on first stored behavioral biometric data personalized to a user associated with the first user device;
   responsive to determining that a first level of similarity between the first behavioral biometric data received and the first stored behavioral biometric data of the first user model is less than a first predetermined threshold:
   initiate a secondary authentication method comprising:
   receiving second behavioral biometric data, the second behavioral biometric data associated with an entry of secondary authentication credentials of the first user account; and
   validating the secondary authentication method; and
   responsive to determining that the first level of similarity is below a second predetermined threshold and the secondary authentication method being positively validated:
   generate a second user model associated with the first user account, wherein:
   the second user model is associated with (i) a second user device and (ii) a second credential entry method on the second user device,
   the first user model is separate from the second user model,
   the first user device is different from the second user device,
   the first credential entry method is different from the second credential entry method; and
   associate the first behavioral biometric data with the second user model.

2. The system of claim 1, wherein:
   the first user model and the second user model are operated in parallel; and
   the instructions, when executed by the one or more processors, further cause the system to:
   receive subsequent behavioral biometric data;
   compare the subsequent behavioral biometric data to the first stored behavioral biometric data of the first user model and second stored behavioral biometric data of the second user model;
   determine whether the subsequent behavioral biometric data is within a second level of similarity to the first user model or the second user model;
   responsive to determining that the subsequent behavioral biometric data within the second level of similarity to the first user model, integrate the subsequent behavioral biometric data into the first stored behavioral biometric data of the first user model;
   responsive to determining that the subsequent behavioral biometric data is within the second level of similarity to the second user model, integrate the subsequent behavioral biometric data into the second stored behavioral biometric data of the second user model; and
   responsive to determining that the subsequent behavioral biometric data is not within the second level of similarity to the first user model or the second user model, create a third user model associated with the first user account using the subsequent behavioral biometric data.

3. The system of claim 1, wherein one of the first and second credential entry methods is a manual credential entry method and the other of the first and second credential entry methods is an automatic entry method utilizing a password manager service.

4. The system of claim 1, wherein comparing the first behavioral biometric data to the first user model comprises comparing current typing time data of the first behavioral biometric data to model time data of the first user model.

5. The system of claim 1, wherein comparing the first behavioral biometric data to the first user model comprises comparing scenario data of the first behavioral biometric data to model scenario data of the first user model, the scenario data (i) comprising device elevation data and device orientation data and (ii) being contemporaneously detected by one or more sensors of the user device along with the entry of primary authentication credentials.

6. The system of claim 1, wherein the instructions, when executed by the one or more processors, further cause the system to:

determine that the entry of primary authentication credentials meets a secondary authentication requirement if the first level of similarity between the first behavioral biometric data and the first stored behavioral biometric data of the first user model is greater than or equal to the first predetermined threshold.

7. The system of claim 6, wherein the instructions, when executed by the one or more processors, further cause the system to:

receive, from the user device, the primary authentication credentials;

responsive to matching the primary authentication credentials to stored primary authentication credentials, determine that the user meets a primary authentication requirement; and responsive to determining that the entry of primary authentication credentials meets the primary authentication requirement and the secondary authentication requirement, provide access to user-accessible system resources.

8. The system of claim 6, wherein the instructions, when executed by the one or more processors, further cause the system to:

in response to the secondary authentication method being positively validated, determine that the entry of primary authentication credentials meets the secondary authentication requirement that the first level of similarity between the first behavioral biometric data and the first stored behavioral biometric data of the first user model is less than the first predetermined threshold.

9. The system of claim 1, wherein:

the first behavioral biometric data comprises device identification data, and the instructions, when executed by the one or more processors, further cause the system to, identify, based on the first behavioral biometric data, the first user device from a plurality of user devices associated with the user.

10. A non-transitory, computer-readable medium having instructions stored thereon that, when executed by one or more processors, cause a computing device to:

receive first behavioral biometric data from a user device, the first behavioral biometric data being associated with an entry of primary authentication credentials on the user device to a first user account;

compare the first behavioral biometric data to a first user model, the first user model associated with (i) a first user device and (ii) a first credential entry method on the first user device, the first user model being based at least in part on first stored behavioral biometric data personalized to a user associated with the first user device;

responsive to determining that a first level of similarity between the first behavioral biometric data received and the first stored behavioral biometric data of the first user model is less than a first predetermined threshold:

initiate a secondary authentication method comprising:

receiving second behavioral biometric data, the second behavioral biometric data associated with an entry of secondary authentication credentials of the first user account; and validating the secondary authentication method; and responsive to determining that the first level of similarity is below a second predetermined threshold and the secondary authentication method being positively validated:

generate a second user model associated with the first user account, wherein:

the second user model is associated with (i) a second user device and (ii) a second credential entry method on the second user device, the first user model is separate from the second user model, the first user device is different from the second user device, the first credential entry method is different from the second credential entry method; and associate the first behavioral biometric data with the second user model.

11. The non-transitory, computer-readable medium of claim 10, wherein one of the first and second credential entry methods is a manual credential entry method and the other of the first and second credential entry methods is an automatic entry method utilizing a password manager service.

12. The non-transitory, computer-readable medium of claim 10, wherein comparing the first behavioral biometric data to the first user model comprises comparing current typing time data of the first behavioral biometric data to model time data of the first user model.

13. The non-transitory, computer-readable medium of claim 10, wherein comparing the first behavioral biometric data to the first user model comprises comparing scenario data of the first behavioral biometric data to model scenario data of the first user model, the scenario data (i) comprising device elevation data and device orientation data and (ii) being contemporaneously detected by one or more sensors of the user device along with the entry of primary authentication credentials.

14. The non-transitory, computer-readable medium of claim 10, wherein the instructions, when executed by the one or more processors, further cause the computing device to:

determine that the entry of primary authentication credentials meets a secondary authentication requirement if the first level of similarity between the first behavioral biometric data and the first stored behavioral biometric data of the first user model is greater than or equal to the first predetermined threshold.

15. The non-transitory, computer-readable medium of claim 14, wherein the instructions, when executed by the one or more processors, further cause the computing device to:

receive, from the user device, the primary authentication credentials;

responsive to matching the primary authentication credentials to stored primary authentication credentials, determine that the user meets a primary authentication requirement; and responsive to determining that the entry of primary authenticaation credentials meets the primary authentication requirement and the secondary authentication requirement, provide access to user-accessible system resources.

16. The non-transitory, computer-readable medium of claim 14, wherein the instructions, when executed by the one or more processors, further cause the computing device to:

in response to the secondary authentication method being positively validated, determine that the entry of primary authentication credentials meets the secondary authentication requirement.

17. The non-transitory, computer-readable medium of claim 10, wherein:
the first behavioral biometric data comprises device identification data, and
the instructions, when executed by the one or more processors, further cause the computing device to, identify, based on the first behavioral biometric data, the first user device from a plurality of user devices associated with the user.

\* \* \* \* \*